(12) United States Patent
Patel et al.

(10) Patent No.: US 11,919,373 B2
(45) Date of Patent: Mar. 5, 2024

(54) LOCKING MECHANISM FOR SLIDEABLE VEHICLE DOORS

(71) Applicant: Ford Global Technologies, LLC, Dearborn, MI (US)

(72) Inventors: Deepak Patel, Canton, MI (US); Zhibing Deng, Northville, MI (US); Joseph E. Abramczyk, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 329 days.

(21) Appl. No.: 17/495,179

(22) Filed: Oct. 6, 2021

(65) Prior Publication Data
US 2023/0105775 A1   Apr. 6, 2023

(51) Int. Cl.
| | |
|---|---|
| B60J 5/04 | (2006.01) |
| B60J 5/06 | (2006.01) |
| B62D 25/04 | (2006.01) |
| E05B 77/48 | (2014.01) |
| E05B 81/06 | (2014.01) |
| E05B 81/18 | (2014.01) |
| E05B 81/26 | (2014.01) |
| E05B 81/56 | (2014.01) |
| E05B 83/38 | (2014.01) |
| E05B 83/40 | (2014.01) |
| E05C 19/00 | (2006.01) |

(52) U.S. Cl.
CPC ........... *B60J 5/0427* (2013.01); *B60J 5/0445* (2013.01); *B60J 5/0479* (2013.01); *B60J 5/06* (2013.01); *B62D 25/04* (2013.01); *E05B 77/48* (2013.01); *E05B 81/06* (2013.01); *E05B 81/18* (2013.01); *E05B 81/26* (2013.01); *E05B 81/56* (2013.01); *E05B 83/38* (2013.01); *E05B 83/40* (2013.01); *E05C 19/003* (2013.01)

(58) Field of Classification Search
CPC ... B60J 5/06; B60J 5/042; B60J 5/0423; B60J 5/0422; B60J 5/0427; B60J 5/0443; B60J 5/0445; E05C 19/003; E05B 77/02; E05B 81/18; E05B 81/06
USPC .................................. 296/155, 146.9, 146.6
See application file for complete search history.

(56) References Cited

U.S. PATENT DOCUMENTS

| | | |
|---|---|---|
| 1,869,274 A | 7/1932 | Phillips |
| 6,694,676 B2 | 2/2004 | Sakamoto et al. |
| (Continued) | | |

FOREIGN PATENT DOCUMENTS

| | | |
|---|---|---|
| GB | 2579383 A | 6/2020 |
| JP | 4019010 B2 | 12/2007 |
| (Continued) | | |

*Primary Examiner* — Dennis H Pedder
(74) *Attorney, Agent, or Firm* — Frank A. MacKenzie; Bejin Bieneman PLC (57) ABSTRACT

An assembly for a vehicle includes a first door and a second door movable from an open position to a closed position. The assembly includes a first anchor supported by the first pillar movable along an axis to an engaged position. The assembly includes a first rod supported by the first door movable along an axis to an engaged position. The assembly includes a second rod supported by the second door movable along the axis to an engaged position. The first anchor is lockingly engaged with the first rod when first anchor is in the engaged position. The first rod is lockingly engaged with the second rod when the first rod is in the engaged position and the first anchor is in the engaged position.

16 Claims, 8 Drawing Sheets

(56) References Cited

U.S. PATENT DOCUMENTS

| | | |
|---|---|---|
| 8,267,464 B2 | 9/2012 | Konchan et al. |
| 9,168,884 B2 | 10/2015 | Horner |
| 9,475,368 B2 | 10/2016 | Choi |
| 10,384,519 B1 | 8/2019 | Brown et al. |
| 10,526,817 B2 | 1/2020 | Gray et al. |
| 2011/0221229 A1 | 9/2011 | Rouhana et al. |
| 2020/0283069 A1 | 9/2020 | Choi et al. |

FOREIGN PATENT DOCUMENTS

| | | |
|---|---|---|
| KR | 101879574 B1 | 7/2018 |
| WO | 2020108859 A1 | 6/2020 |

LOCKING MECHANISM FOR SLIDEABLE VEHICLE DOORS

BACKGROUND

A vehicle may include amenities that allow occupants ingress and egress of the vehicle. For example, a vehicle may not include a middle pillar, e.g., a B-pillar between front and rear pillars, e.g., A-pillar and C-pillar, to allow more space for occupants to ingress and egress the vehicle. Specifically, such vehicles may include two doors that meet at the location traditionally occupied by the middle when in a closed position. The door may be rotatable about the A-pillar and the C-pillar, respectively, such that the doors rotate away from each other to an open position.

DETAILED DESCRIPTION

A vehicle includes a vehicle body having a first pillar and a second pillar spaced from each other. The vehicle includes a first door supported by the first pillar and a second door supported by the second pillar. The first door and the second door are movable relative to each other between an open positioned and a closed position. A first anchor is supported by the first pillar and a second anchor is supported by the second pillar. A first rod is supported by and movable relative to the first door and a second rod is supported by and movable relative to the second door. The first rod and the second rod are coaxial on an axis and the first rod is translatable by the first anchor along the axis into engagement with the second rod and the second rod is translatable by the first rod into engagement with the second anchor when the doors are in the closed position.

One of the first and second anchors may be rotatable about the axis.

A motor may be operatively coupled to the second anchor to rotate the second anchor.

The first rod may be spring-loaded away from the second rod and the second rod may be spring-loaded away from the second anchor.

The vehicle may include a first sheath supported by the first door and housing the first rod and a first spring between the first sheath and the first rod, the first spring biasing the first rod toward a recessed position relative to the first door. The vehicle may include a second sheath supported by the second door and housing the second rod and a second spring between the second sheath and the second rod, the second spring biasing the second rod toward a recessed position relative to the second door.

The first anchor and the second anchor may be on the axis.

The vehicle may include a motor operatively coupled to the first anchor to translate the first anchor toward the first rod. The vehicle may include a motor operatively coupled to the second anchor to rotate the second anchor.

The vehicle may include one of a pin or a slot on the first anchor and the other of the pin or the slot on the first rod, the pin being engageable with the slot.

The vehicle may include one of a pin or a slot on the first rod and the other of the pin or the slot on the second rod, the pin being engageable with the slot.

The vehicle may include one of a pin or a slot on the second rod and the other of a pin or a slot on the second anchor, the pin being engageable with the slot.

The vehicle may include one of a first pin or a first slot on the first anchor and the other of the first pin or the first slot on the first rod, the first pin being engageable with the first slot; one of a second pin or a second slot on the first rod and the other of the second pin or the second slot on the second rod, the second pin being engageable with the second slot; and one of a third pin or a third slot on the second rod and the other of the third pin or the slot on the second anchor, the third pin being engageable with the third slot.

The first anchor and the second anchor may be on the axis.

The vehicle may include a computer including a processor and a memory storing instructions executable by the processor to: in response to the doors being moved from the open position to the closed position, translate the first anchor along the axis toward the first rod; and in response to instruction that the doors be moved to the open position, translate the first anchor along the axis away from the first rod. The instructions include instructions to: in response to the doors being moved from the open position to the closed position; rotate the first anchor and/or the second anchor to engage the first rod with the second rod; and in response to instruction that the doors be moved to the open position, rotate the first anchor and/or the second anchor to disengage the first rod and the second rod from each other.

With reference to the Figures, wherein like numerals indicate like parts throughout the several views, a vehicle 10 includes a vehicle body 12 having a first pillar 14 and a second pillar 16 spaced from each other. A first door 38 is supported by the first pillar 14 and a second door 40 is supported by the second pillar 16. The first door 38 and the second door 40 are movable relative to each other between an open position and a closed position. A first anchor 18 is supported by the first pillar 14 and a second anchor 20 is supported by the second pillar 16. A first rod 22 is supported by and movable relative to the first door 38. A second rod 24 is supported by and movable relative to the second door 40. The first rod 22 and the second rod 24 are coaxial on an axis A. The first rod 22 is translatable by the first anchor 18 along the axis A into engagement with the second rod 24 and the second rod 24 is translatable by the first rod 22 into engagement with the second anchor 20 when the doors are in the closed position.

When the first rod 22 engages the second rod 24 when the doors are in the closed position, the first rod 22 and second rod 24 provide a continuous structural reinforcement between the doors. Specifically, the first anchor 18 anchors the first rod 22 to the first pillar 14 and the second anchor 20 anchors the second rod 24 to the second pillar 16, and the first rod 22 engages the second rod 24 so that the first rod 22 and the second rod 24 span the door opening 36 and are both anchored to the vehicle body 12. In the event of certain side impacts, the rods 22, 24 may limit intrusion into the vehicle 10 by the side impact. As one example, the vehicle shown in the example in the figures does not include a middle pillar between the first pillar 14 and the second pillar 16 and the rods 22, 24 reinforce the area between the first and second pillars 14, 16 14, 16. Specifically, the rods 22, 24 extend from the first pillar 14 to the second pillar 16, including the area between the doors traditionally occupied by a middle pillar, to reduce the likelihood of intrusion during side impact.

With reference to the figures, the vehicle 10 may be any suitable type of automobile, e.g., a passenger or commercial automobile such as a sedan, a coupe, a truck, a sport utility, a crossover, a van, a minivan, a taxi, a bus, etc. The vehicle 10, for example, may be autonomous. In other words, the vehicle 10 may be autonomously operated such that the vehicle 10 may be driven without constant attention from the driver, i.e., the vehicle 10 may be self-driving without human input.

Figure 1:
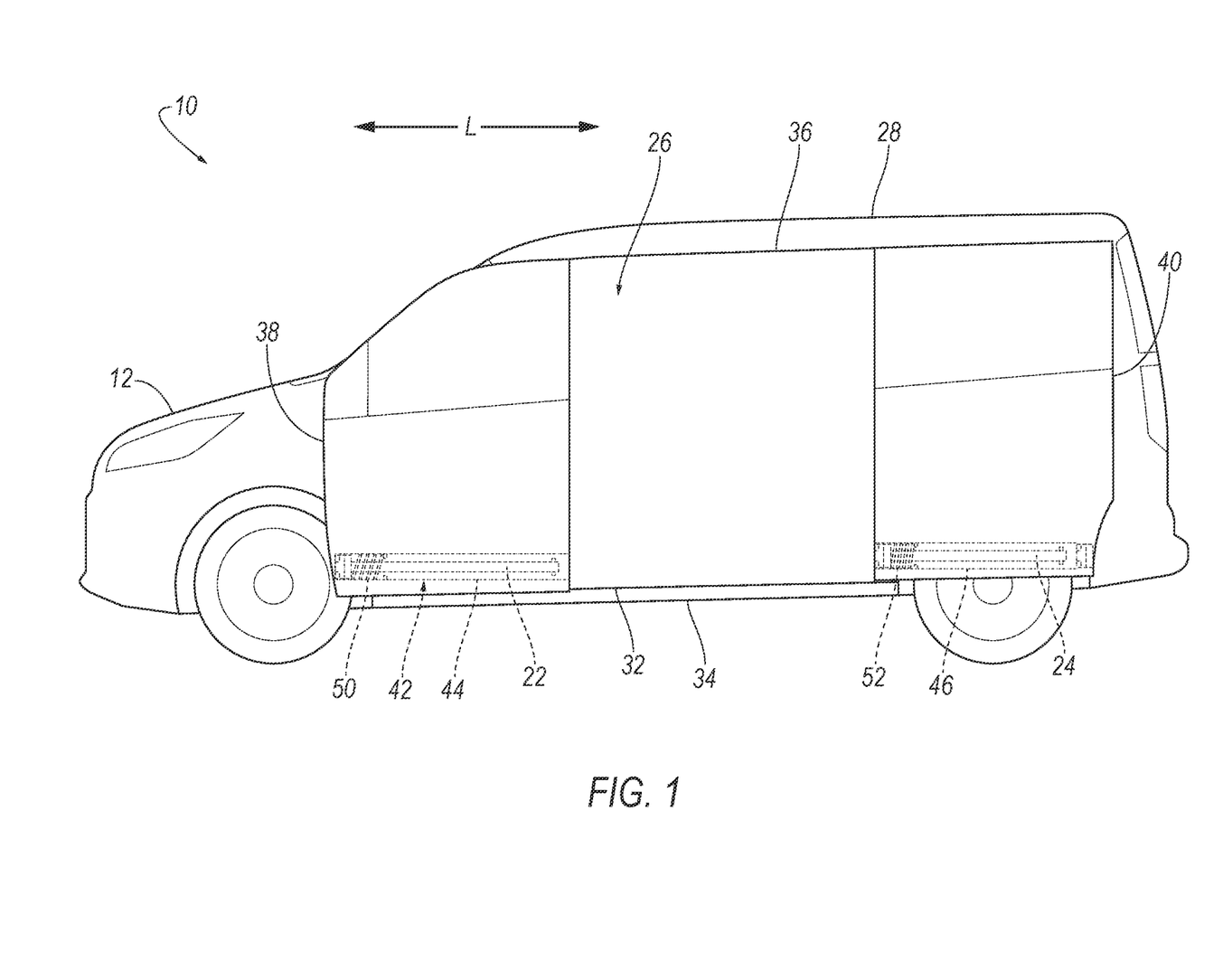
FIG. 1 is a side view of a vehicle having doors in an open position and a reinforcement assembly supported by the doors.

As shown in FIG. 1 the vehicle 10 includes a vehicle frame (not numbered) and the vehicle body 12. The vehicle frame and the vehicle body 12 may be of a unibody construction in which the frame is unitary with a vehicle body 12 (including frame rails, pillars 14, 16, roof rails 30, rockers 34, etc.). As another example, the vehicle body 12 and vehicle frame may have a body-on-frame construction (also referred to as a cab-on-frame construction) in which the vehicle body 12 and frame are separate components, i.e., are modular, and the vehicle body 12 is supported on and affixed to the frame. Alternatively, the vehicle frame and vehicle body 12 may have any suitable construction. The vehicle frame and vehicle body 12 (e.g., frame rails, pillars 14, 16, roof rails 30, rockers 34, etc.) may be of any suitable material, for example, steel, aluminum, and/or fiber-reinforced plastic, etc.

The vehicle body 12 may define a passenger compartment 26 to house occupants, if any, of the vehicle 10. The passenger compartment 26 may extend across the vehicle 10, i.e., from one side to the other side of the vehicle 10. The passenger compartment 26 includes a front end and a rear end with the front end being in front of the rear end during forward movement of the vehicle 10.

The vehicle body 12 may include a roof 28. The roof 28 may define the upper boundary of the passenger compartment 26 and may extend from the front end of the passenger compartment 26 to the rear end of the passenger compartment 26. The roof 28 may include two or more roof rails 30. The roof rails 30 are spaced from one another in a cross-vehicle direction. The roof rails 30 each be elongated longitudinally along the vehicle body 12. The roof 28 may include a roof panel and a headliner. In such an example, the roof panel faces exterior to the vehicle 10 and the headliner faces the passenger compartment 26. The roof panel and/or the headliner may extend from one roof rail 30 to the other roof rail 30.

The vehicle body 12 includes a floor 32 spaced downwardly from the roof 28. The floor 32 may define the lower boundary of the passenger compartment 26 and may extend from the front end of the passenger compartment 26 to the rear end of the passenger compartment 26. The floor 32 may include a floor panel and upholstery on the floor 32. The upholstery may be, for example, carpet, and may have a class-A surface facing the passenger compartment 26, i.e., a surface specifically manufactured to have a high quality, finished, aesthetic appearance free of blemishes. The floor 32 may include cross-beams connected to the floor panel and to other components of the vehicle body 12.

The vehicle body 12 includes rockers 34 extending from the first pillar 14 to the second pillar 16. Specifically, the vehicle body 12 may include two rockers 34, one on each side of the vehicle body 12. The rockers 34 are elongated along a vehicle-longitudinal axis L. The rockers 34 are spaced from the roof rails 30 below the roof rails 30. The roof panel, rockers 34, floor panel, and pillars 14, 16 14, 16 may be irremovably fixed to each other, i.e., unable to be removed without cutting or other destruction of the roof panel and/or roof 28. In some examples, the pillars 14, 16 14, 16 may be unitary with the rockers 34 and/or the roof 28, i.e., a single, uniform piece of material with no seams, joints, fasteners, or adhesives connecting the pillars 14, 16 to the rockers 34 and/or the roof 28. In such an example, the pillars 14, 16 and rockers 34 and/or roof rails 30 may be formed together simultaneously as a single continuous unit, e.g., by stamping, molding, etc. In other examples, in the alternative to being unitary, the pillars 14, 16 may be formed separately from the rockers 34 and/or roof rails 30 and subsequently connected to the rockers 34 and/or frame rails, e.g., by welding As set forth above, the vehicle body 12 includes pillars 14, 16 spaced from each along the vehicle-longitudinal axis L. Specifically, the second pillar 16 may be spaced vehicle-rearward of the first pillar 14, i.e., the first pillar 14 may be referred to as an A-pillar and the second pillar 16 may be referred to as a C-pillar even in examples in which there is no middle pillar. The vehicle body 12 includes pillars 14, 16 on each side of the vehicle 10, i.e., the vehicle body 12 includes one first pillar 14 and one second pillar 16 on each side of the vehicle 10. The first pillar 14 may be disposed at the front end of the passenger compartment 26 and the second pillar 16 may be disposed at the rear end of the passenger compartment 26. The pillars 14, 16 may extend from the roof 28 to the floor 32. The vehicle 10 may include other pillars 14, 16 in addition to the first pillar 14 and second pillar 16.

With continued reference to FIG. 1 the vehicle body 12 may not include a middle pillar between the first pillar 14 and the second pillar 16, i.e., the vehicle body 12 may not include a middle pillar between the first pillar 14 and the second pillar 16 from the floor 32 to the roof 28. In other words, the vehicle body 12 is B-pillarless. The vehicle body 12 lacking a middle pillar allows for the door opening 36, described further blow, to extend from the first pillar 14 to the second pillar 16. The door opening 36 extending from the first pillar 14 to the second pillar 16 allows occupants easier access to the passenger compartment 26 for ingress and egress.

The vehicle body 12 defines the door opening 36. The door opening 36 may be between the first pillar 14 and the second pillar 16 and between the rocker 34 and the roof rail 30. Specifically, the door opening 36 may extend from the first pillar 14 to the second pillar 16 and from the rocker 34 to the roof rail 30. In other words, the pillars 14, 16 are spaced from each other by the door opening 36 and the roof rail 30 and rocker 34 are spaced from each other by the door opening 36. The door opening 36 extends uninterrupted from the first pillar 14 to the second pillar 16. The door opening 36 extends uninterrupted from the rocker 34 to the roof rails 30. The door opening 36 allows for ingress and egress into the passenger compartment 26. The vehicle 10 may include any suitable number of door openings to allow for ingress and egress into the passenger compartment 26. For example, the vehicle 10 may include a door opening 36 on each side of the vehicle 10.

The vehicle 10 includes a plurality of doors on each side of the body. As an example, the vehicle 10 may include the first door 38 supported by the first pillar 14 and the second door 40 supported by the second pillar 16. The first door 38 and the second door 40 may be movably mounted to the vehicle body 12, e.g., the first pillar 14 and the second pillar 16, respectively. For example, the first door 38 and the second door 40 may be slidably mounted, hingedly mounted, etc., to the vehicle body 12.

Figure 2:
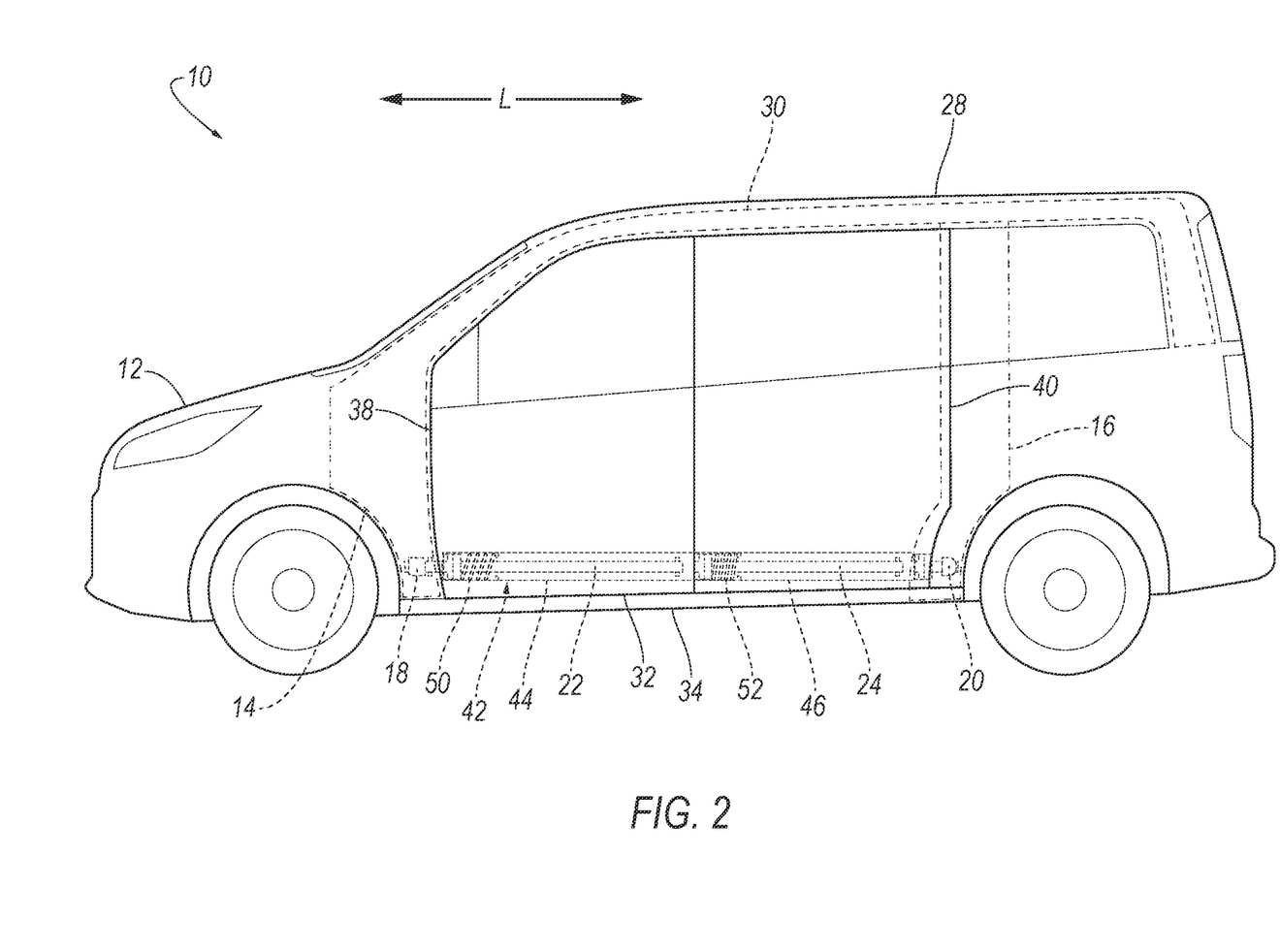
FIG. 2 is a side view of the vehicle having doors in a closed position and the reinforcement assembly supported by the doors in a disengaged position.
Figure 3:
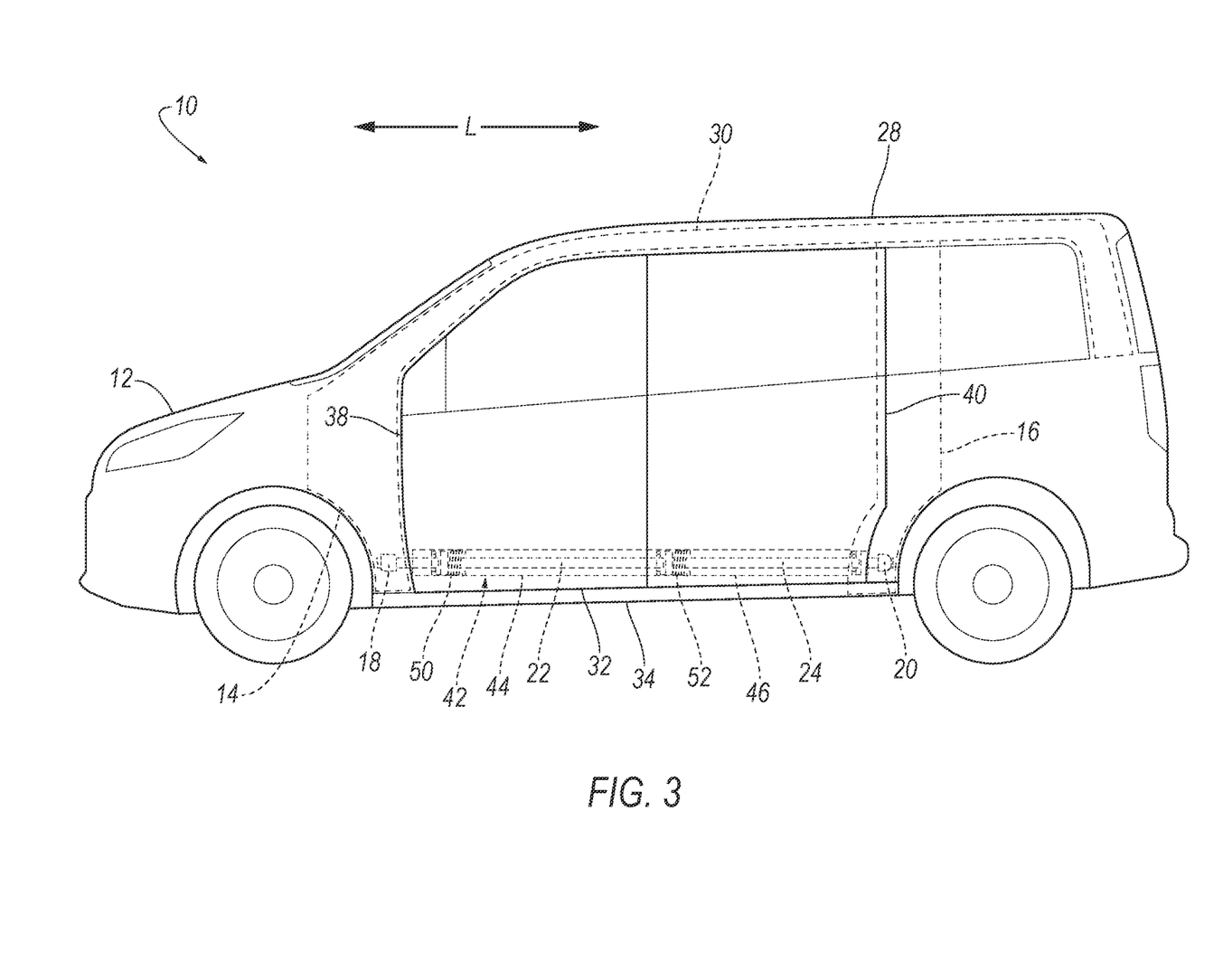
FIG. 3 is a side view of the vehicle having doors in the closed position and the reinforcement assembly supported by the doors in an engaged position.

As shown in FIGS. 2 and 3, the first door 38 and the second door 40 are movable relative to each other between an open positioned and a closed position. In the closed position, the doors are in at least one of the door openings 36 in the vehicle body 12. In the example shown in the figures, the first door 38 and the second door 40 are both in the single one of door openings 36. The doors may abut each other and may abut the pillars 14, 16, the rocker 34, and the roof 28 in the closed position. In the open position, the door opening 36 is exposed for occupant ingress and egress.

The doors may be slidable between the open position and the closed position. For example, the vehicle body 12 may include a track with the doors being slidably supported by the track. In such examples, the doors are slidable between the closed position to the open position. In the closed position, the first door 38 and the second door 40 are adjacent each other, e.g., may abut each other. As the doors move to the open position, the first door 38 moves away from the second door 40 and toward the front end of the passenger compartment 26 and the second door 40 moves away from the first door 38 toward the rear end of the passenger compartment 26. In other examples, the first door 38 and/or the second door 40 may be rotatably mounted, e.g., hinged, to the first pillar 14 and second pillar 16, respectively. In such an example, the doors rotate between the closed position and the open position.

The doors include at least one door panel and a door-trim panel supported on the door panel. Specifically, the doors may include two panels, namely a door inner and a door outer. In such an example, the door-trim panel and the door outer are fixed to the door inner. The door-trim panel is positioned opposite the door outer relative to the door frame. The door-trim panel is inboard relative to the door inner, and the door outer is outboard relative to the door inner. The doors include a window opening that may be completely closed by a window when the window is in a fully raised position. The window door opening 36 is defined by the door-trim panel and door outer on a bottom edge and either by the door inner circumscribing the window door opening 36 or by the vehicle body 12. The door outer faces outboard relative to the vehicle 10.

The door outer may define a portion of the exterior of the vehicle 10. For example, the door outer may present a class-A surface, i.e., a surface specifically manufactured to have a high-quality, finished aesthetic appearance free of blemishes. The door outer may be metal (such as steel, aluminum, etc.) or polymeric (such as fiber reinforced plastic composite, etc.).

As shown in FIG. 2. the vehicle 10 includes a reinforcement assembly 42 including the first anchor 18, the second anchor 20, the first rod 22, and the second rod 24. The reinforcement assembly 42 is movable between an engaged position and a disengaged position. In the engaged position, the first anchor 18 is engaged with the first rod 22, the first rod 22 is engaged with the second rod 24, and the second rod 24 is engaged with the second anchor 20. In the engaged position, the reinforcement assembly 42 extends across the door opening 36 from the first pillar 14 to the second pillar 16, is supported by the first door 38 and the second door 40, and is anchored to the first pillar 14 and the second pillar 16 to resist door intrusion during a vehicle side impact. For example, in the example in which the vehicle body 12 does not include a pillar between the first pillar 14 and the second pillar 16, the reinforcement assembly 42 reinforces the first door 38 and the second door 40 in the area at which the first door 38 meets the second door 40. In the disengaged position, the first rod 22 is disengaged with the first anchor 18, the second rod 24 is disengaged with the second anchor 20, and the first rod 22 and the second rod 24 are disengaged with each other. In the disengaged position, the reinforcement assembly 42 does not restrict movement of the first door 38 relative to the first pillar 14, movement of the second door 40 relative to the first pillar 14, or movement of the first door 38 and second door 40 relative to each other. Specifically, when the reinforcement assembly 42 is in the disengaged position, the reinforcement assembly 42 does not restrict movement of the first door 38 and the second door 40 between the closed and opened positions.

The first rod 22 is supported by the first door 38 and the second rod 24 is supported by the second door 40. Specifically, the first rod 22 moves with the first door 38 as the first door 38 moves between the closed and opened positions and the second rod 24 moves with the second door 40 as the second door 40 moves between the closed and opened positions. As an example, the first rod 22 and the second rod 24 may be between the door outer and the door-trim panel of the first door 38 and the second door 40, respectively. The first rod 22 and the second rod 24 may be, for example, connected to the door inner and/or the door outer of the first door 38 and the second door 40, respectively.

As shown in FIG. 3 the first rod 22 is movable relative to the first door 38 and the second rod 24 movable relative to the second door 40. Specifically, the first rod 22 is translatable relative to the first door 38 and the second rod 24 is translatable relative to the second door 40, e.g., by movement of the first anchor 18 when the doors are in the closed position as described further below. In the example shown in the figures, the first rod 22 and the second rod 24 are translatable along the axis A of the reinforcement assembly 42. The first rod 22 and the second rod 24 are elongated, e.g., elongated on the vehicle-longitudinal axis L in the example shown in the figures. The first rod 22 and the second rod 24 are coaxial when the doors are closed, e.g., coaxial on the axis A in the example in the figures.

The first rod 22 and the second rod 24 are movable relative to the first door 38 and the second door 40, respectively, between a retracted position and an extended position. In the retracted position, the first rod 22 is in the first door 38 without protruding from the first door 38 and the second rod 24 is in the second door 40 without protruding from the second door 40. In the extended position, the first rod 22 protrudes from the first door 38 and the second rod 24 protrudes from the second door 40. Specifically, in the extended position, the first rod 22 protrudes from the first door 38 toward the second door 40 and the second rod 24 protrudes from the second door 40 toward the second pillar 16.

The first rod 22 and the second rod 24 are designed to resist door intrusion when the reinforcement assembly 42 is in the engaged position. The first rod 22 and the second rod 24 may be, for example, metal such as steel. The first rod 22 and the second rod 24 may have a round cross-section.

Figure 4:
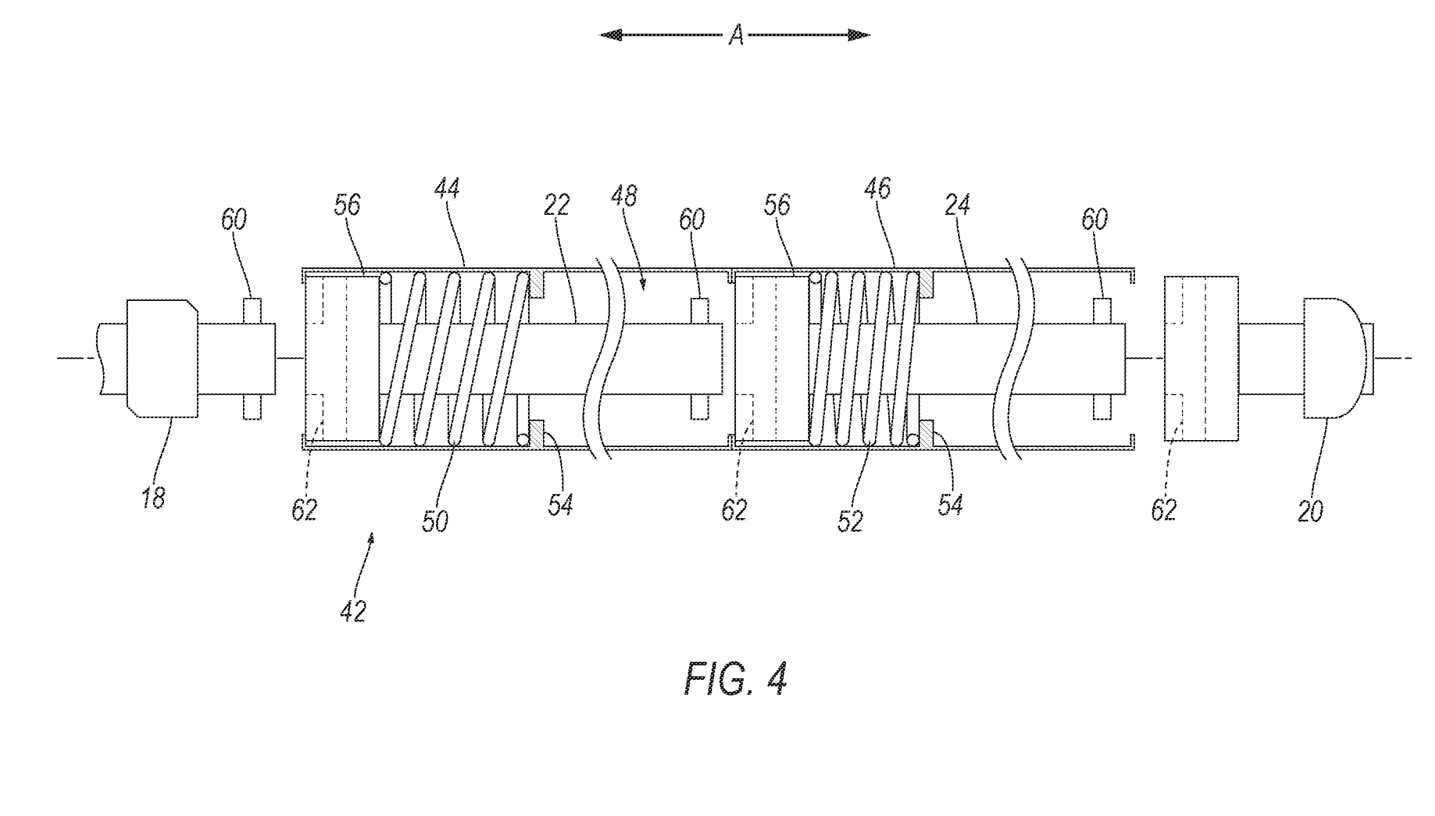
FIG. 4 is a cross-sectional view of the reinforcement assembly having a first anchor, first rod, second rod, and a second anchor in the disengaged position.

As shown in FIG. 4 the reinforcement assembly 42 may include a first sheath 44 supported by the first door 38 and housing the first rod 22 and a second sheath 46 supported by the second door 40 and housing the second rod 24. Specifically, the first sheath 44 and the second sheath 46 are in the first door 38 and second door 40 respectively. For example, the first sheath 44 and the second sheath 46 are between the door outer and the door-trim panel. The first sheath 44, for example, may be connected directly to the door inner and/or door outer of the first door 38 and the second sheath 46, for example, may be connected directly to the door inner and/or door outer of the second door 40, e.g., by welding, fasteners, etc.

The first rod 22 is movably supported by the first sheath 44 and the second rod 24 is movably supported by the second sheath 46. For example, the first sheath 44 and the second sheath 46 include a channel 48 that slidably receives the first rod 22 and the second rod 24, respectively. The first rod 22 and the second rod 24 slide relative to the first sheath 44 and the second sheath 46 between the extended and retracted positions.

In the example shown in the figures, the first sheath 44 and the second sheath 46 are elongated and the channel 48 is cylindrical and extends through the sheath. In the example shown in the figures, in the retracted position, the first rod 22 is in the first sheath 44 without protruding from the first sheath 44 and the second rod 24 is in the second sheath 46 without protruding from the second sheath 46. In the extended position shown in FIG. 5, the first rod 22 protrudes from the first sheath 44 and the second rod 24 protrudes from the second sheath 46. The first sheath 44 and the second sheath 46 are coaxial when the doors are in the closed position, e.g., coaxial on the axis A in the example in FIGS. 4 and 5. In the example shown in the figures, the first sheath 44 and the second sheath 46 are elongated, e.g., elongated along the vehicle-longitudinal axis L. The sheaths 44, 46 may be, for example, metal. The sheaths 44, 46 may have a round cross-section.

Figure 5:
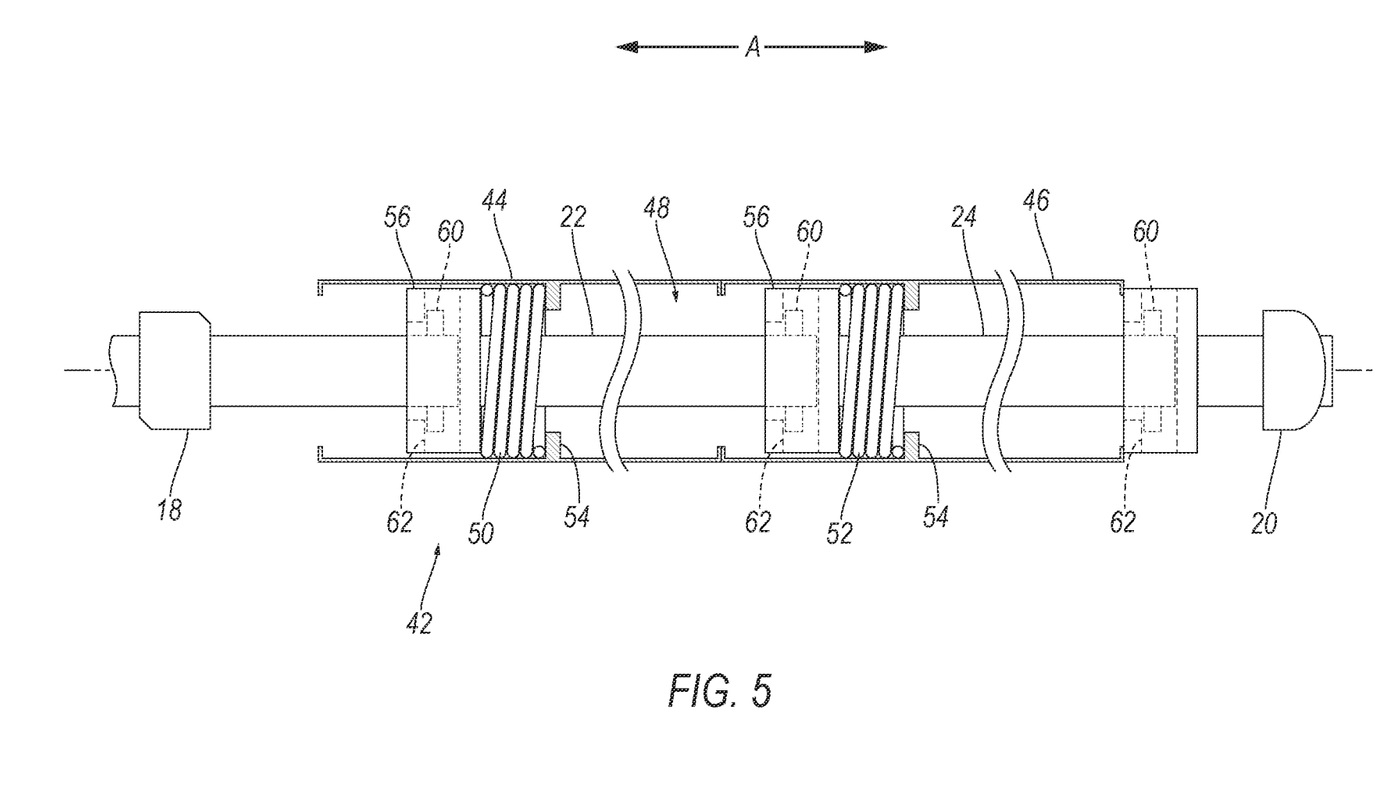
FIG. 5 is a cross-sectional view of the reinforcement assembly having the first anchor, first rod, second rod, and the second anchor in the engaged position.

The first rod 22 and the second rod 24 may be spring loaded in the first sheath 44 and the second sheath 46, respectively. Specifically, the assembly may include a first spring 50 in the first sheath 44 and a second spring 52 in the second sheath 46. The springs 50, 52 bias the first rod 22 and the second rod 24, respectively, toward the retracted position. Accordingly, when the doors are in the closed position, the first rod 22 is spring-loaded away from the second rod 24 and the second rod 24 is spring-loaded away from the second anchor 20. The springs 50, 52, for example, may be coil springs wrapped around the rod 22, 24. The springs 50, 52 are disposed between the rods 22, 24 and the sheaths 44, 46. For example, in the example shown in the figures, the sheath 44, 46 includes a ledge 54 that extends into the channel 48 and the rod 22, 24 includes a head 56 with the spring 50, 52 retained between the ledge 54 and the head 56.

As shown in FIGS. 2-6 the reinforcement assembly 42 includes the first anchor 18 supported by the first pillar 14 and the second anchor 20 supported by the second pillar 16. The first anchor 18 and the second anchor 20 may be connected indirectly to the first pillar 14 and second pillar 16, respectively, e.g., through motors 58, 68 as described below. As another example, the first anchor 18 and the second anchor 20 may be connected directly to the first pillar 14 and the second pillar 16, respectively. The pillars 14, 16, for example, may include an inner panel (not numbered) and an outer panel (not numbered) and the anchor 18, 20 may be between the first panel and the second panel.

The first anchor 18 and the second anchor 20 may be on the axis A. In the example shown in the figures, the first anchor 18 and the second anchor 20 are coaxial on the axis A with each other and with the first rod 22 and the second rod 24.

With reference to FIG. 5 the first anchor 18 is movable relative to the first pillar 14 to engage the first rod 22 and to move the first rod 22 toward and into engagement with the second rod 24, which moves the second rod 24 toward and into engagement with the second anchor 20. In other words, movement of the first anchor 18 at least in part moves the reinforcement assembly 42 to the engaged position. In the example shown in the figures, the first anchor 18 translates relative to the first pillar 14, which translates both the first rod 22 and the second rod 24 to engage the first anchor 18 with the first rod 22, to engage the first rod 22 with the second rod 24, and engage the second rod 24 with the second anchor 20 in the engaged position. In some examples, such as the example shown in the figures, the first and/or second anchor 20 may rotate, e.g., in addition to the translation, to move the reinforcement assembly 42 to the engaged position.

Figure 7:
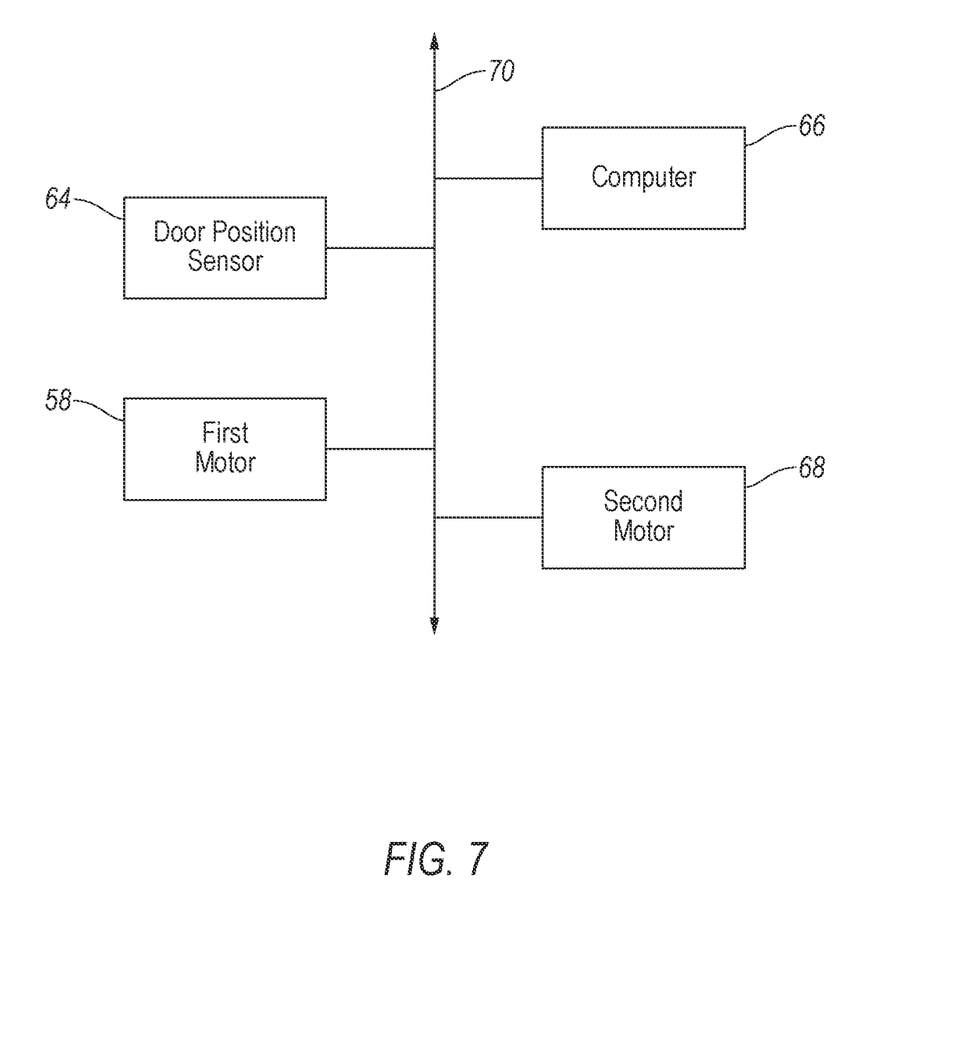
FIG. 7 is a block diagram of a vehicle communication network of the vehicle

As shown in FIG. 7 the reinforcement assembly 42 may include a motor 58 operatively coupled to the first anchor 18 to translate the first anchor 18 toward the first rod 22. Specifically, the motor 58 translates the first anchor 18 into engagement with the first rod 22 to move the first rod 22 from the recessed position to the extended position, which engages the first rod 22 with the second rod 24, which engages the second rod 24 with the second anchor 20, as described above. In other words, the motor 58 at least in part moves the reinforcement assembly 42 to the engaged position. The motor 58 may be fixed to the first anchor 18 to move the first anchor 18. The motor 58 may be supported by the first pillar 14 and, for example, may be connected directly to the first pillar 14, e.g., with fasteners. The motor 58 may be, for example, an electrically-powered linear actuator, a solenoid actuator, etc. As an example, an armature of the linear actuator, solenoid actuator, etc., be the first rod 22.

As set forth above, the first anchor 18 and/or second anchor 20 may be rotatable about the axis A. The rotation of the first anchor 18 and/or the second anchor 20 may lock the anchors 18, 20 and/or rods 22, 24 with each other in the engaged position, as described further below.

With reference to FIG. 7 the reinforcement assembly 42 may include a motor 68 operatively coupled to the first anchor 18 or the second anchor 20 to rotate the first anchor 18 or the second anchor 20. Specifically, the motor 68 rotates the first anchor 18 and/or the second anchor 20. In an example in which the motor 68 rotates the first anchor 18, rotation of the first anchor 18 rotates the first rod 22 and the second rod 24 and engages the second rod 24 with the second anchor 20, as described below. In an example in which the motor 68 rotates the second anchor 20, rotation of the second anchor 20 rotates the second rod 24 and the first rod 22 and engages the first rod 22 with the first anchor 18. In such examples, the motor 68 in part moves the reinforcement assembly 42 to the engaged position, i.e., locks the reinforcement assembly 42 in the engaged position, as described below. The motor 68 may be fixed to the first anchor 18 or the second anchor 20. The motor 68 may be supported by the first pillar 14 or the second pillar 16, e.g., by direct connection by fasteners, etc. The motor 68 may be, for example, an electrically powered rotary motor 68.

Figure 6:
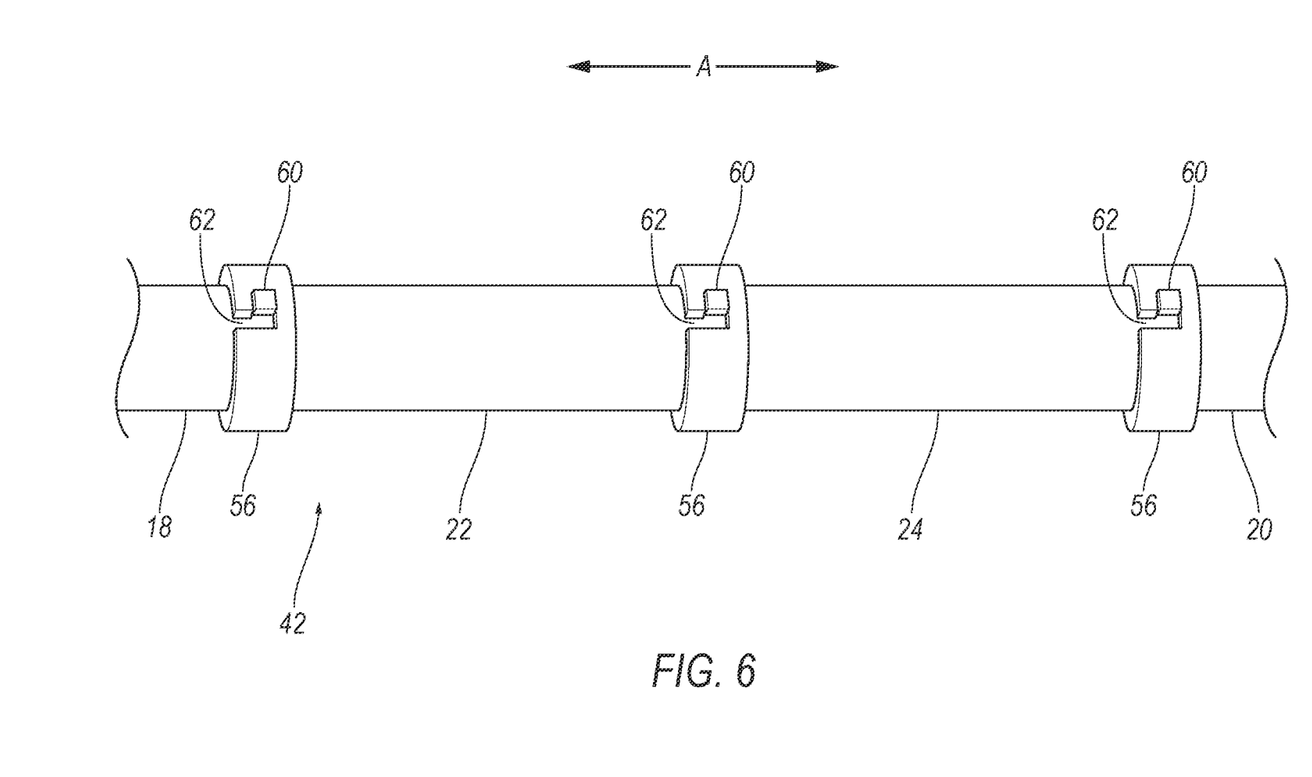
FIG. 6 is a side view of the reinforcement assembly having the first anchor, first rod, second rod, and the second anchor in the engaged position.

In examples in which the first anchor 18 or second anchor 20 rotates, the rotating anchor can lock the first anchor 18 to the first rod 22, lock the first rod 22 to the second rod 24, and lock the second rod 24 to the second anchor 20. For example, as shown in FIGS. 4-6 the reinforcement assembly 42 may include pins 60 and slots 62 that engage each other on adjacent ones of the anchors 18, 20 and rods 22, 24. The slot 62 may include a first portion along the axis A and a second portion transverse to the first portion. The pins 60 may be aligned with first portion of the corresponding slot 62 in the disengaged position. Each pin 60 engages the first portion of the corresponding slot 62 when the first anchor 18 translates the first rod 22 and the second rod 24 and each pin 60 engages the second portion of the corresponding slot 62 when the first anchor 18 or second anchor 20 rotates.

As shown in FIG. 6, for example, the first anchor 18 includes one of a pin 60 or a slot 62 and the first rod 22 includes the other of a corresponding pin 60 or slot 62; the first rod 22 includes one of a pin 60 or a slot 62 and the second rod 24 includes the other of a corresponding pin 60 or slot 62; and the second rod 24 includes one of a pin 60 or a slot 62 and the second anchor 20 includes the other of a corresponding pin 60 or slot 62. Adjacent anchors 18, 20 and rods 22, 24 may have a plurality of corresponding pins 60 and slots 62. For example, the first anchor 18 may include a plurality of pins 60 or slots 62 and the first rod 22 may include a plurality of corresponding pins 60 or slots 62, etc. In the example shown in the figures, the first anchor 18 includes a pin 60 and the first rod 22 includes a corresponding slot 62; the first rod 22 has a pin 60 and the second rod 24 has a corresponding slot 62; and the second rod 24 has a pin 60 and the second anchor 20 has a corresponding slot 62. In such an example translation of the first anchor 18 moves the pin 60 of the first anchor 18 into the first portion of the slot 62 of the first rod 22, moves the pin 60 of the first rod 22 into the first portion of the slot 62 of the second rod 24, and moves the pin 60 of the second rod 24 into the first portion of the slot 62 of the second anchor 20. Rotation of the first anchor 18 or the second anchor 20 moves the pin 60 of the first anchor 18 into the second portion of the slot 62 of first rod 22, moves the pin 60 of the first rod 22 into the second portion of the slot 62 of the second rod 24, and moves the pin 60 of the second rod 24 into the second portion of the slot 62 of the second anchor 20. In this position, the reinforcing assembly is locked in the engaged position. To unlock the reinforcing assembly and move the reinforcing assembly, the movements are reversed, i.e., the first anchor 18 or second anchor 20 is rotated to move the pins 60 to the first portions of the slots 62 and the first anchor 18 is translated to release the first rod 22 to the retracted position, which allows the second rod 24 to move to the retracted position.

With reference to FIG. 7 the vehicle 10 may include one or more door position sensors 64. The door position sensors 64 may indicate whether the doors are in the open position or the closed position. The door position sensors 64 may be in communication with a computer 66 of the vehicle 10. The door position sensors 64 may send a signal to the computer 66 to indicate whether the doors are in the open position or the closed position. The vehicle 10 may include any suitable number of door position sensors 64 to determine the orientation of the doors. In other words, the vehicle 10 may include a number of door position sensors 64 equal to the number of doors of the vehicle 10.

With continued reference FIG. 7. the assembly includes a computer 66 including a processor and a memory. The memory includes one or more forms of computer 66 readable media and stores instructions executable by the processor to perform various actions. For example, the computer 66 can be a generic computer with a processor and memory as described above and/or may include an electronic control unit ECU or controller for a specific function or set of functions, and/or a dedicated electronic circuit including an ASIC that is manufactured for a particular operation, e.g., an ASIC for processing sensor data and/or communicating the sensor data. In another example, computer 66 may include an FPGA (Field-Programmable Gate Array) which is an integrated circuit manufactured to be configurable by a user. Typically, a hardware description language such as VHDL (Very High-Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g. stored in a memory electrically connected to the FPGA circuit. In some examples, a combination of processor(s), ASIC(s), and/or FPGA circuits may be included in a computer 66. The memory can be of any type, e.g., hard disk drives, solid state drives, servers, or any volatile or non-volatile media. The memory can store the collected data sent from the sensors. The memory can be a separate device from the computer 66, and the computer 66 can retrieve information stored by the memory via a network in the vehicle 10, e.g., over a CAN bus, a wireless network, etc. Alternatively or additionally, the memory can be part of the computer 66, e.g., as a memory of the computer 66. The computer 66 may include programming to operate one or more of vehicle brakes, propulsion e.g., control of acceleration in the vehicle 10 by controlling one or more of an internal combustion engine, electric motor, hybrid engine, etc., steering, climate control, interior and/or exterior lights, etc., as well as to determine whether and when the computer 66, as opposed to a human operator, is to control such operations. Additionally, the computer 66 may be programmed to determine whether and when a human operator is to control such operations. The computer 66 may include or be communicatively coupled to, e.g., via a vehicle network such as a communications bus as described further below, more than one processor, e.g., included in components such as sensors, electronic control units (ECUs) or the like included in the vehicle 10 for monitoring and/or controlling various vehicle components, e.g., a powertrain controller, a brake controller, a steering controller, etc. The computer 66 is generally arranged for communications on a vehicle communication network 70 that can include a bus in the vehicle 10 such as a controller area network CAN or the like, and/or other wired and/or wireless mechanisms. Alternatively or additionally, in cases where the computer 66 actually comprises a plurality of devices, the vehicle communication network 70 may be used for communications between devices represented as the computer 66 in this disclosure. Further, as mentioned below, various controllers and/or sensors may provide data to the computer 66 via the vehicle communication network 70.

Figure 8:
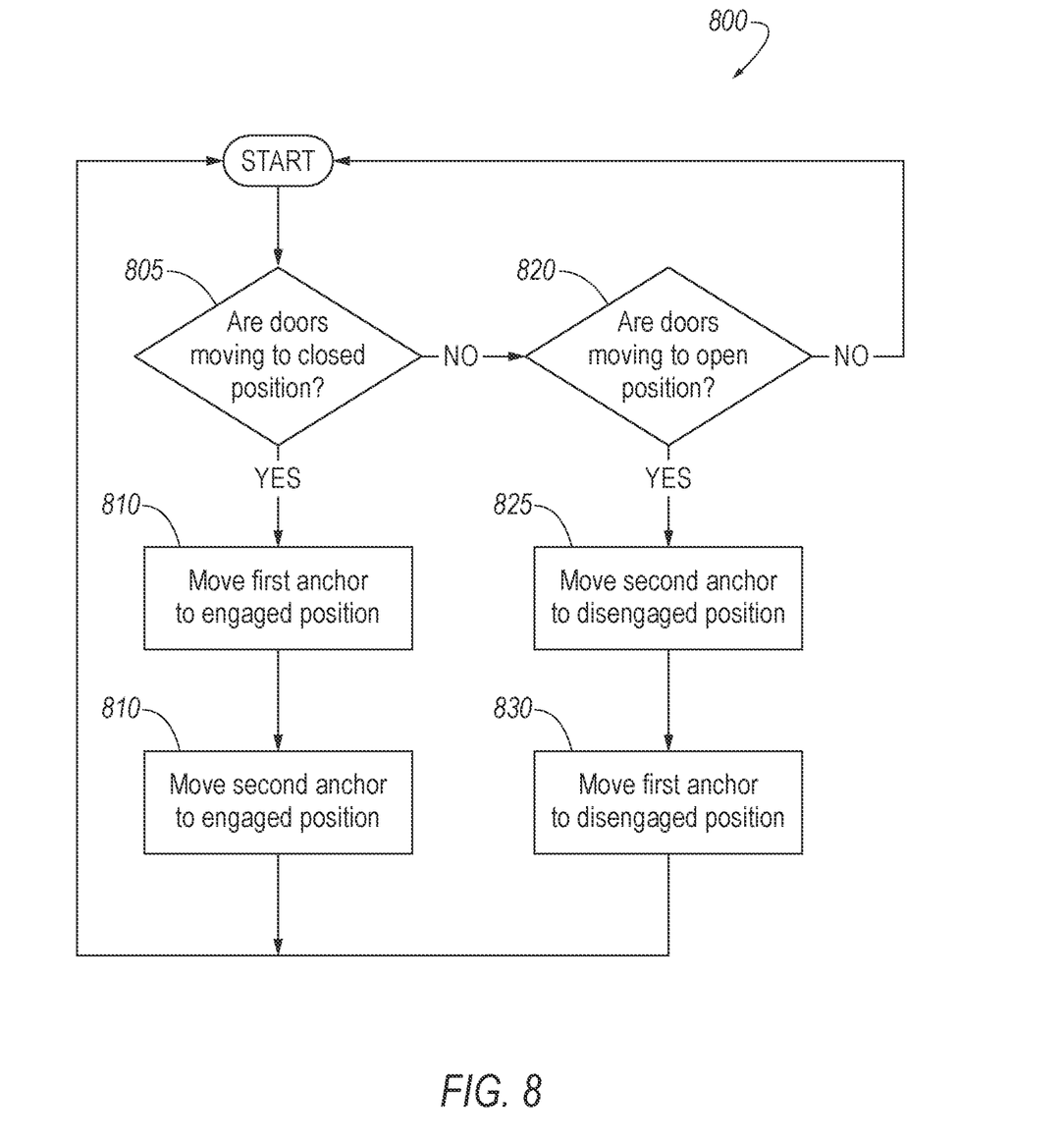
FIG. 8 is a flow chart of a method for moving the first anchor, the first rod, the second rod, and the second anchor from the disengaged position to the engaged position.

The computer 66 stores instructions to control components in the vehicle 10 according to method 800 shown in FIG. 8. Specifically, the method 800 controls the first anchor 18 and the second anchor 20 based on the position of the doors 38, 40. Use of "in response to," or "based on," and "upon determining" herein, including with reference to method 800, indicates a causal relationship, not merely a temporal relationship.

With reference to decision block 805, the method includes identifying whether the doors 38, 40 have moved from the open position to the closed position based on information from the door position sensors 64. For example, the door position sensors 64 may detect movement of the doors 38, 40 from the open position to the closed position based on input from a passenger of the vehicle 10 to move the doors 38, 40 to the closed position, e.g., by pushing a button in the vehicle 10 or by other inputs from the vehicle 10. In such an example, the door position sensor 64 may send a signal to the computer 66 to move the doors 38, 40 to the closed position based on the information provided by the door position sensors 64. As another example, the door position sensors 64 may detect the presence or absence of the door 38, 40 from a predetermined position indicating the location of the door 38, 40 in the closed position. If the doors 38, 40 are not moved to the closed position, the method moves to decision block 820, as described further below.

With reference to block 810 in response to detection that the door 38, 40 moved from the open position to the closed position, e.g., in response to a signal from the door sensor 64 that the doors 38, 40 have moved from the open position to the closed position, the computer 66 moves the reinforcement assembly 42 to the engaged position in blocks 810 and 815. Block 810 is shown before block 815 in FIG. 8 merely as an example; block 810 may be performed before, after, or simultaneously with block 815.

With reference to block 810, in response to detection that the door 38, 40 moved from the open position to the closed position, the computer 66 moves the first rod 22 from the retracted position to the extended position. Specifically, the computer 66 may send instruction, e.g., send a signal, to the motor 58 that is coupled to the first pillar 14 to move the first anchor 18 from the disengaged to the engaged position. As set forth above, movement of the motor 58 from the disengaged position to the engaged position translates the first anchor 18 along the axis A toward the first rod 22, which engages the first rod 22 with the second rod 24 and engages the second rod 24 with the second anchor 20.

With reference to block 815, in response to detection that the door 38, 40 moved from the open position to the closed position, the computer 66 rotates the first anchor 18 and/or the second anchor 20 to engage the first rod 22 with the second rod 24. In the example shown in the figures, the computer 66 instructs the motor 68 coupled to the second pillar 16, e.g., sends a signal to the motor 68, to move the second anchor 20 from the disengaged to the engaged position. Specifically, as set forth above, the motor 68 rotates the second anchor 20, which rotates the second rod 24 and the first rod 22 to engage the anchors 18, 20 and the rods 22, 24.

When the reinforcement assembly 42 is in the engaged position, the reinforcement assembly 42 reinforces the doors 38, 40 as described above. The reinforcement assembly 42 may remain in the engaged position until instructed to move to the disengaged position, e.g., based on input from a passenger attempting to move the door 38, 40 from the closed position to the open position, as described below.

With reference to block 820, the method includes identifying that the door 38, 40 are moving from the closed position to the open position, i.e., that the door 38, 40 is about to move to the open position, e.g., based on input a passenger, input from the vehicle, etc. Specifically, the position sensors 64 may detect movement of the door 38, 40 from the closed position to the open position. As an example, the position sensors 64 may determine that the door 38, 40 is moving from the closed position to the open position based on an input from a passenger of the vehicle 10 to move the door 38, 40 to the open position, e.g., by pushing a button in the vehicle 10, or by other inputs from the vehicle 10. In other words, in such an example, the input from the passenger indicates that the door 38, 40 is about to move from the closed position to an open position. With reference to block 820, in response to detection that the door 38, 40 is moving from the closed position to the open position, e.g., in response to a signal from the door sensor 64 that the doors 38, 40 are about to move from the closed position to the open position, the computer 66 moves the reinforcement assembly 42 to the disengaged position in blocks 825 and 830. Block 825 is shown before block 830 in FIG. 8 merely as an example; block 825 may be performed simultaneously with block 830.

With reference to block 825, in response to detection that the door 38, 40 is moving from the closed position to the open position, the computer 66 rotates the first anchor 18 and/or the second anchor 20 to disengage the first rod 22 with the second rod 24. In the example shown in the figures, the computer 66 instructs the motor 68 coupled to the second pillar 16, e.g., sends a signal to the motor 68, to move the second anchor 20 from the disengaged to the engaged position. Specifically, as set forth above, the motor 68 rotates the second anchor 20, which rotates the second rod 24 and the first rod 22 to disengage the anchors 18, 20 and the rods 22, 24.

With reference to block 830, in response to detection that the door 38, 40 is moving from the closed position to the open position, the computer 66 moves the first rod 22 from the extended position to the retracted position. Specifically, the computer 66 may send instruction, e.g., sends a signal, to the motor 58 that is coupled to the first pillar 14 to move the first anchor 18 from the engaged to the disengaged position. As set forth above, movement of the motor 58 from the engaged position to the disengaged position translates the first anchor 18 along the axis A away the first rod 22, which disengages the first rod 22 with the second rod 24 and disengages the second rod 24 with the second anchor 20.

With the reinforcement assembly 42 in the disengaged position, the doors 38, 40 are free to move to the open position, as described above. The reinforcement assembly 42 may remain in the disengaged position until the doors 38, 40 are moved to the closed position.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. A vehicle comprising:
   a vehicle body having a first pillar and a second pillar spaced from each other;
   a first door supported by the first pillar and a second door supported by the second pillar, the first door and the second door being movable relative to each other between an open position and a closed position;
   a first anchor supported by the first pillar and a second anchor supported by the second pillar; and
   a first rod supported by and movable relative to the first door and a second rod supported by and movable relative to the second door;
   the first rod and the second rod being coaxial on an axis and the first rod being translatable by the first anchor along the axis into engagement with the second rod and the second rod being translatable by the first rod into engagement with the second anchor when the first door and second door are in the closed position.

2. The vehicle as set forth in claim 1, wherein one of the first and second anchors is rotatable about the axis.

3. The vehicle as set forth in claim 1, further comprising a motor operatively coupled to the second anchor to rotate the second anchor.

4. The vehicle as set forth in claim 1, wherein the first rod is spring-loaded away from the second rod and the second rod is spring-loaded away from the second anchor.

5. The vehicle as set forth in claim 1, further comprising:
a first sheath supported by the first door and housing the first rod; and
a first spring between the first sheath and the first rod, the first spring biasing the first rod toward a recessed position relative to the first door.

6. The vehicle as set forth in claim 5, further comprising:
a second sheath supported by the second door and housing the second rod; and
a second spring between the second sheath and the second rod, the second spring biasing the second rod toward a recessed position relative to the second door.

7. The vehicle as set forth in claim 1, wherein the first anchor and the second anchor are on the axis.

8. The vehicle as set forth in claim 1, further comprising a motor operatively coupled to the first anchor to translate the first anchor toward the first rod.

9. The vehicle as set forth in claim 8, further comprising a motor operatively coupled to the second anchor to rotate the second anchor.

10. The vehicle as set forth in claim 1, further comprising one of a pin or a slot on the first anchor and the other of the pin or the slot on the first rod, the pin being engageable with the slot.

11. The vehicle as set forth in claim 1, further comprising one of a pin or a slot on the first rod and the other of the pin or the slot on the second rod, the pin being engageable with the slot.

12. The vehicle as set forth in claim 1, further comprising one of a pin or a slot on the second rod and the other of a pin or a slot on the second anchor, the pin being engageable with the slot.

13. The vehicle as set forth in claim 1, further comprising:
one of a first pin or a first slot on the first anchor and the other of the first pin or the first slot on the first rod, the first pin being engageable with the first slot;
one of a second pin or a second slot on the first rod and the other of the second pin or the second slot on the second rod, the second pin being engageable with the second slot; and
one of a third pin or a third slot on the second rod and the other of the third pin or the slot on the second anchor, the third pin being engageable with the third slot.

14. The vehicle as set forth in claim 1, wherein the first anchor and the second anchor are on the axis.

15. The vehicle as set forth in claim 1, further comprising a computer including a processor and a memory storing instructions executable by the processor to:
in response to the doors being moved from the open position to the closed position, translate the first anchor along the axis toward the first rod; and
in response to instruction that the doors be moved to the open position, translate the first anchor along the axis away from the first rod.

16. The vehicle as set forth in claim 15, wherein the instructions include instructions to:
in response to the doors being moved from the open position to the closed position; rotate the first anchor and/or the second anchor to engage the first rod with the second rod; and
in response to instruction that the doors be moved to the open position, rotate the first anchor and/or the second anchor to disengage the first rod and the second rod from each other.

* * * * *